(12) United States Patent
Buckley

(10) Patent No.: US 11,300,793 B1
(45) Date of Patent: Apr. 12, 2022

(54) SYSTEMS AND METHODS FOR COLOR DITHERING

(71) Applicant: Facebook Technologies, LLC, Menlo Park, CA (US)

(72) Inventor: Edward Buckley, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 50 days.

(21) Appl. No.: 16/998,474

(22) Filed: Aug. 20, 2020

(51) Int. Cl.
*G02B 27/01* (2006.01)
*H04N 13/15* (2018.01)
*H04N 13/00* (2018.01)

(52) U.S. Cl.
CPC ......... *G02B 27/0172* (2013.01); *H04N 13/15* (2018.05); *G02B 2027/011* (2013.01); *G02B 2027/0112* (2013.01); *H04N 2013/0077* (2013.01)

(58) Field of Classification Search
CPC .......... G02B 27/0172; G02B 2027/011; G02B 2027/0112; H04N 13/15; H04N 2013/0077
See application file for complete search history.

(56) References Cited

U.S. PATENT DOCUMENTS

| | | | |
|---|---|---|---|
| 2017/0278447 A1* | 9/2017 | Yaras | G09G 5/10 |
| 2017/0346989 A1* | 11/2017 | Crounse | H04N 1/60 |
| 2018/0254020 A1* | 9/2018 | Buckley | G09G 3/2059 |
| 2019/0056594 A1* | 2/2019 | Kolchin | G09G 3/3426 |

* cited by examiner

*Primary Examiner* — Brent D Castiaux
(74) *Attorney, Agent, or Firm* — Baker Botts L.L.P.

(57) ABSTRACT

In one embodiment, a computing system may determine a barycentric coordinate system associated with a target color value for a target image region. The system may determine barycentric weights for the target color value with respect to vertices of the barycentric coordinate system. The system may determine a number of pixel groups for the target image region based on the barycentric weights of the target color value and a dithering mask satisfying a spatial stacking constraint. Each pixel group may be associated with a color of a color space associated with the vertices of the barycentric coordinate system. The system may generate an image including the target image region by assigning pixels in the pixel groups to associated colors, respectively. The average color value of the target image region may substantially equal to the target color value.

20 Claims, 15 Drawing Sheets

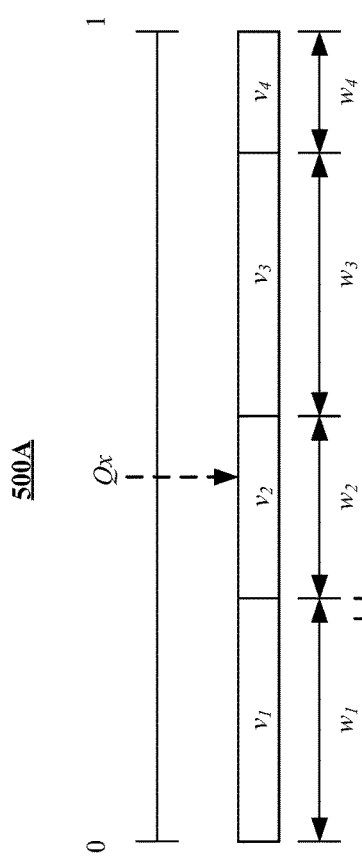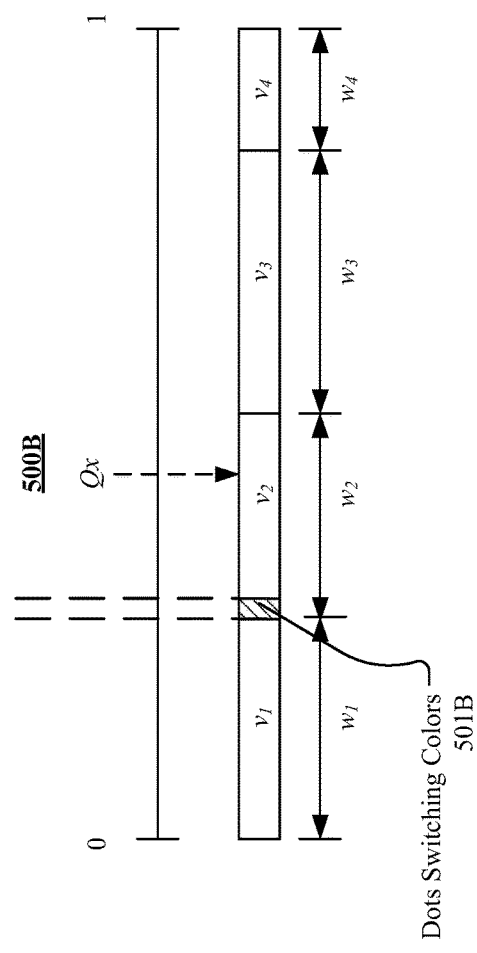

US 11,300,793 B1

SYSTEMS AND METHODS FOR COLOR DITHERING

TECHNICAL FIELD

This disclosure generally relates to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to a method for color dithering based on a color dithering mask and barycentric weights of the target color values with respect to an associated barycentric coordinate system. The color dithering mask may cause the generated image with the dithered colors to have a color stacking property (if a pixel is set to a color, that pixel will remain that color when the target color changes gradually or slightly) and a spatial stacking property (if a pixel is turned on by an initial threshold value, that pixel will stay on for all threshold values greater than the initial threshold value). For example, for a target color falling within a barycentric coordinate system corresponding to a tetrahedron associated with a color space, the system may determine the barycentric weights of the target color value with respect to the associated barycentric coordinate system. The target color value may be represented by a linear combination of the colors (e.g., RGBK) of the color space as weighted by the barycentric weights. The target color of an image region may be represented by an average color of that region including different groups of pixels being turned into different colors. The pixel groups of different colors may be determined based on the corresponding dot groups in the color dithering mask. The dots in the color dithering mask may be divided into a number of subsets corresponding different sub-masks. The dots in each sub-mask may be assigned to one or more sub-groups with the dots in each sub-group being assigned to a particular color. The system may determine the dot percentage values or dot density values of each sub-group based on the barycentric weights and the threshold ranges of the sub-masks of the color dithering mask. For a given dot in the color dithering mask having a threshold value Q, the system may determine the corresponding sub-mask threshold values based on the threshold value Q. Then, the system may determine, for each dot in the color dithering mask and based on a comparison of an associated sub-mask threshold value and an accumulative sum of the dot percentage values, a corresponding color that the dot needs to turn to.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5A illustrates an example process for determining dithered colors based on accumulative sum of barycentric weights and threshold values from a dithering mask.

FIG. 5B illustrates example dots that switch to a different color caused by a slight change in the target color value.

DESCRIPTION OF EXAMPLE EMBODIMENTS

For a color falling with a tetrahedron associated with a color space, the color may be represented by a linear combination of colors corresponding to tetrahedron vertices as weighted by corresponding barycentric weights. For still images, the dithered colors of a pixel may be determined based on associated tetrahedron vertices by comparing an accumulative sum of the barycentric weights and a threshold value of a dithering mask. However, for video images, this method may cause artifacts such as shimmering or flickering since the color stacking property is not preserved. For example, in one frame, a pixel is dithered to a first color may switch to a different color even if the target color changes only slightly. This artifact may have negative effect on displayed video images and the overall user experiences of the AR/VR systems.

In particular embodiments, the system may use a color dithering mask (satisfying spatial stacking property) and barycentric weights of target color values to generate images with dithered colors. The color dithering mask may include a number of sub-masks each having a fixed percentage of the total dots of the color dithering mask. The system may determine the sub-groups of dots in each sub-mask that need to be turned into particular colors based on barycentric weights of target color values with respect to an associated coordinate system. Then, the system may turn on the dots of different groups into corresponding colors to represent the target color value in a target image region.

By representing the target color values using dots with dithered colors as determined in this way, particular embodiments of the system may generate images that satisfy the dot density stacking constraint and the color stacking constraint. For the spatial stacking property, when a dot is turned on by an initial threshold value, that dot may stay on for all threshold values that are greater than the initial threshold value. For the color stacking property, when the target color value gradually changes between frames, a dot that is turned on with a particular color may stay on with that particular color without switching to other colors in subsequent frames (which may cause the flickering and shimmering artifacts). As a result, particular embodiments of the system may provide better image quality for displaying video images and improve user experience for AR/VR display by eliminating the flickering and shimmering artifacts.

Figure 1A:
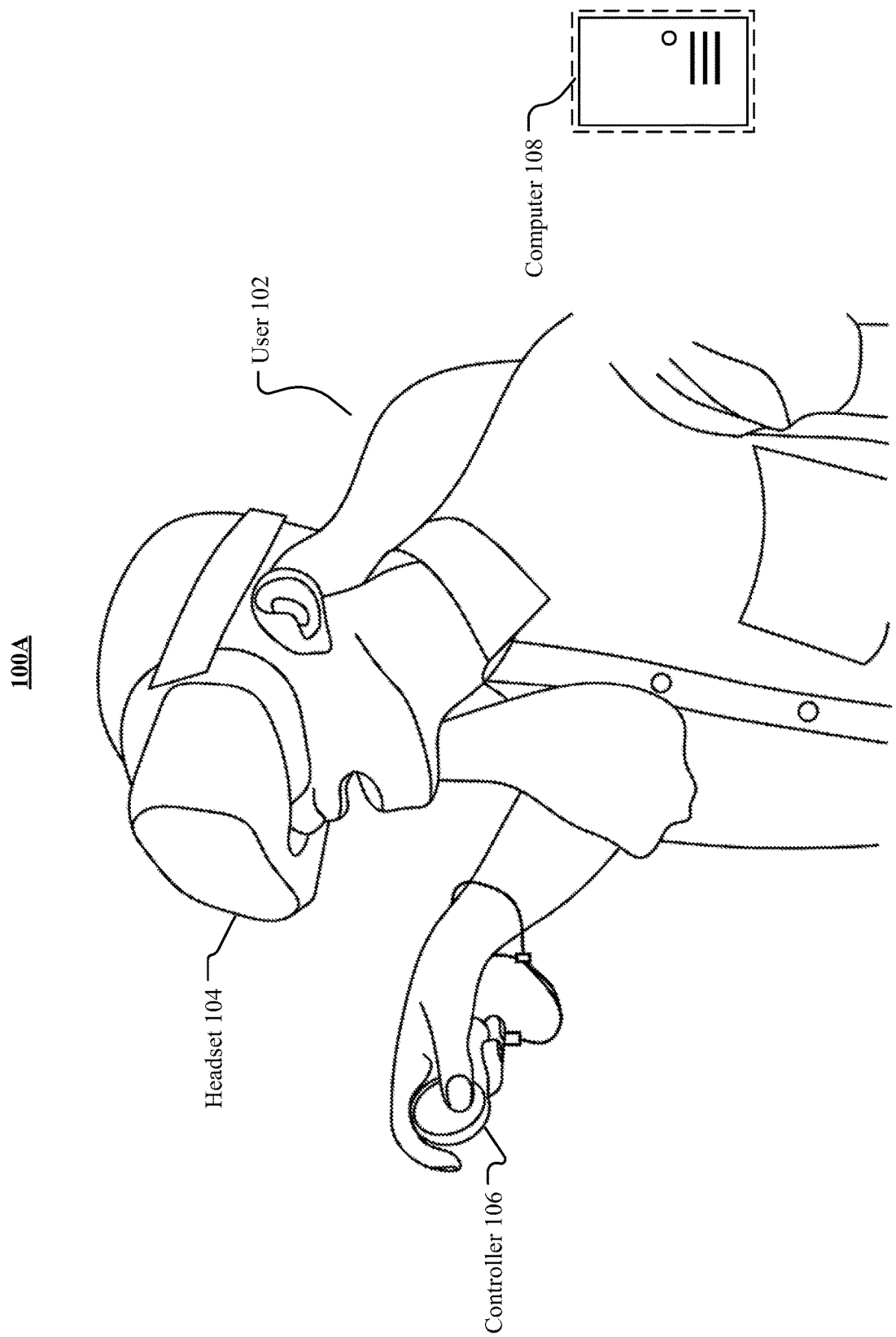
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
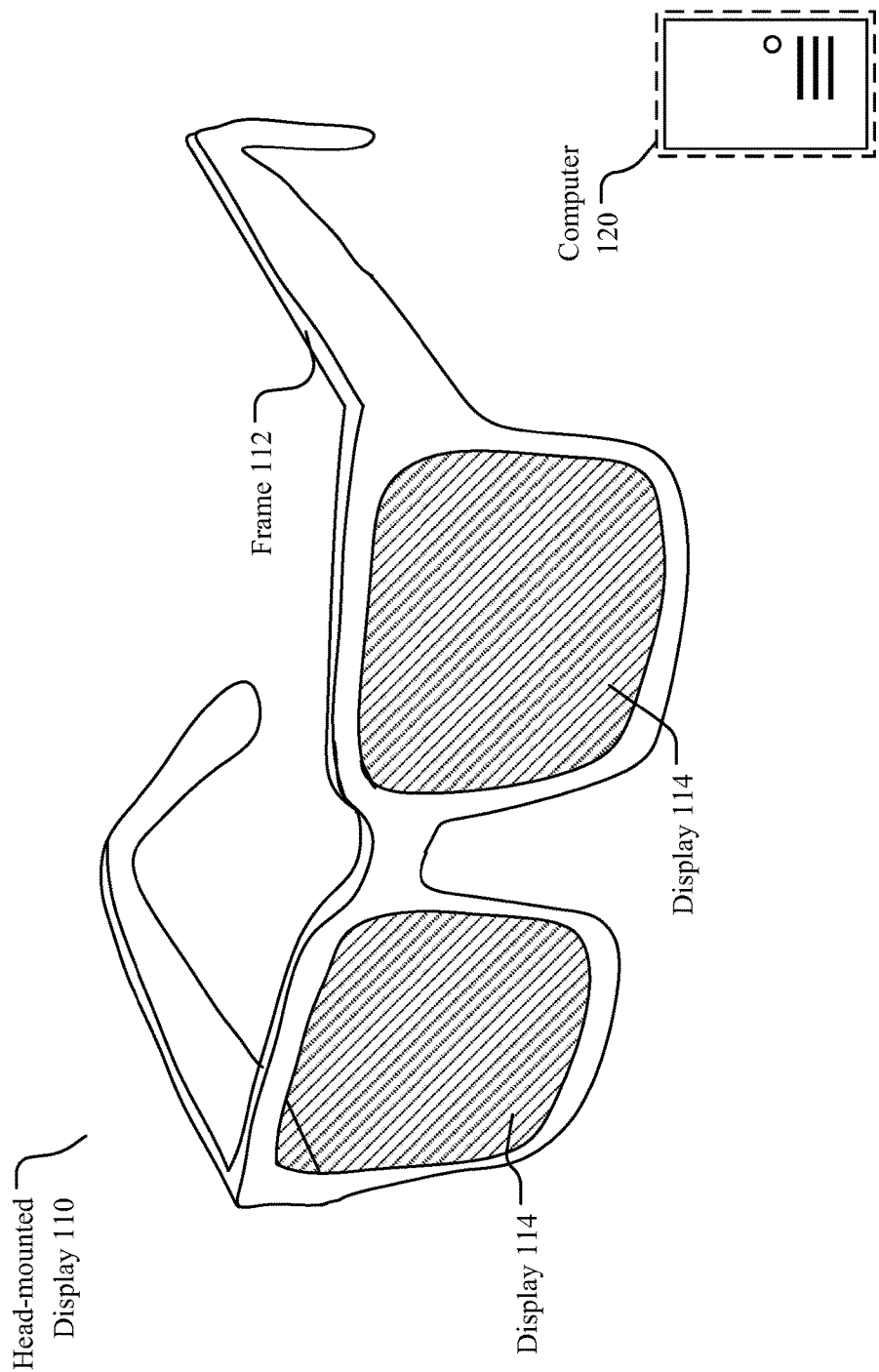
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
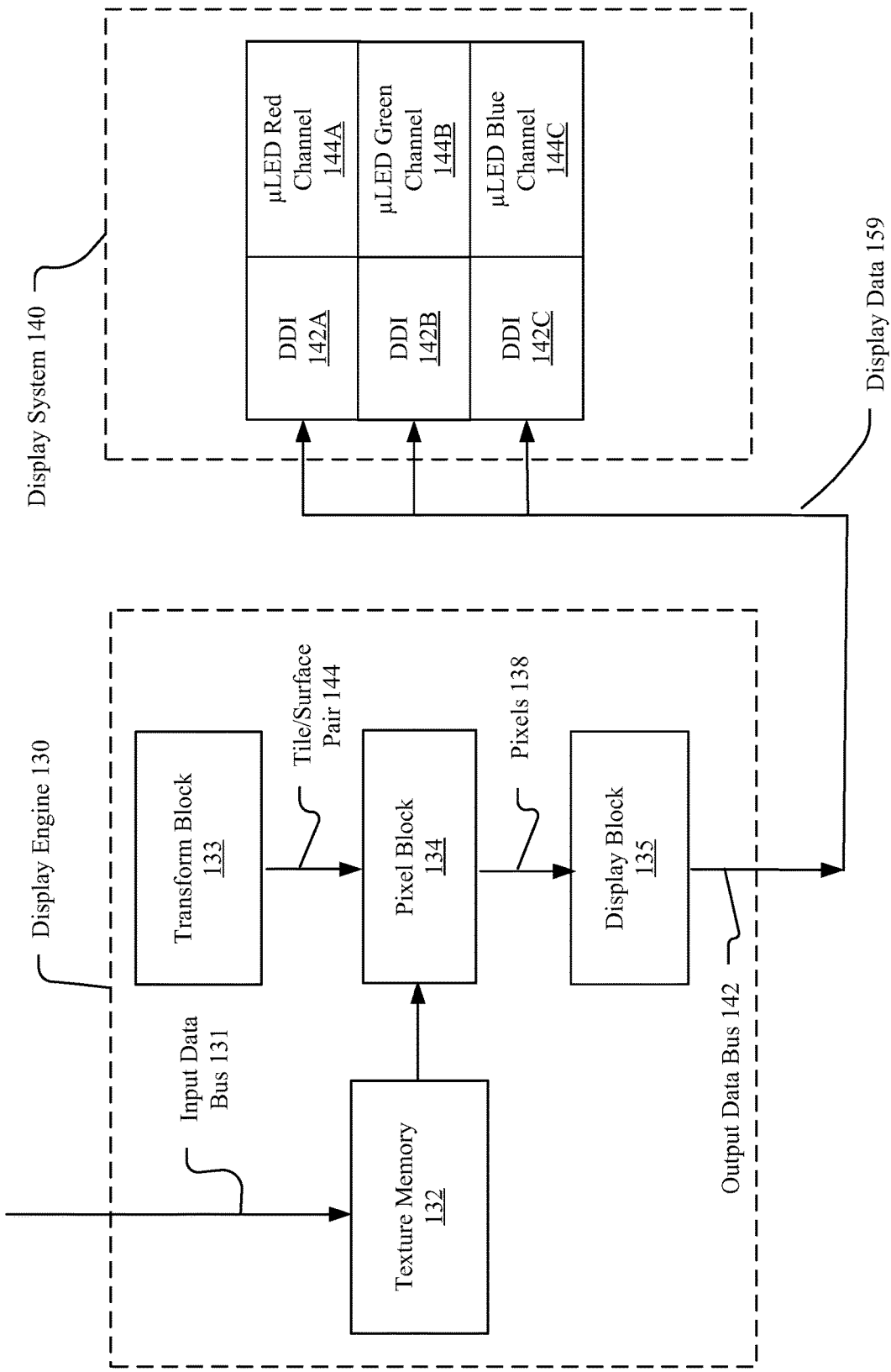
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
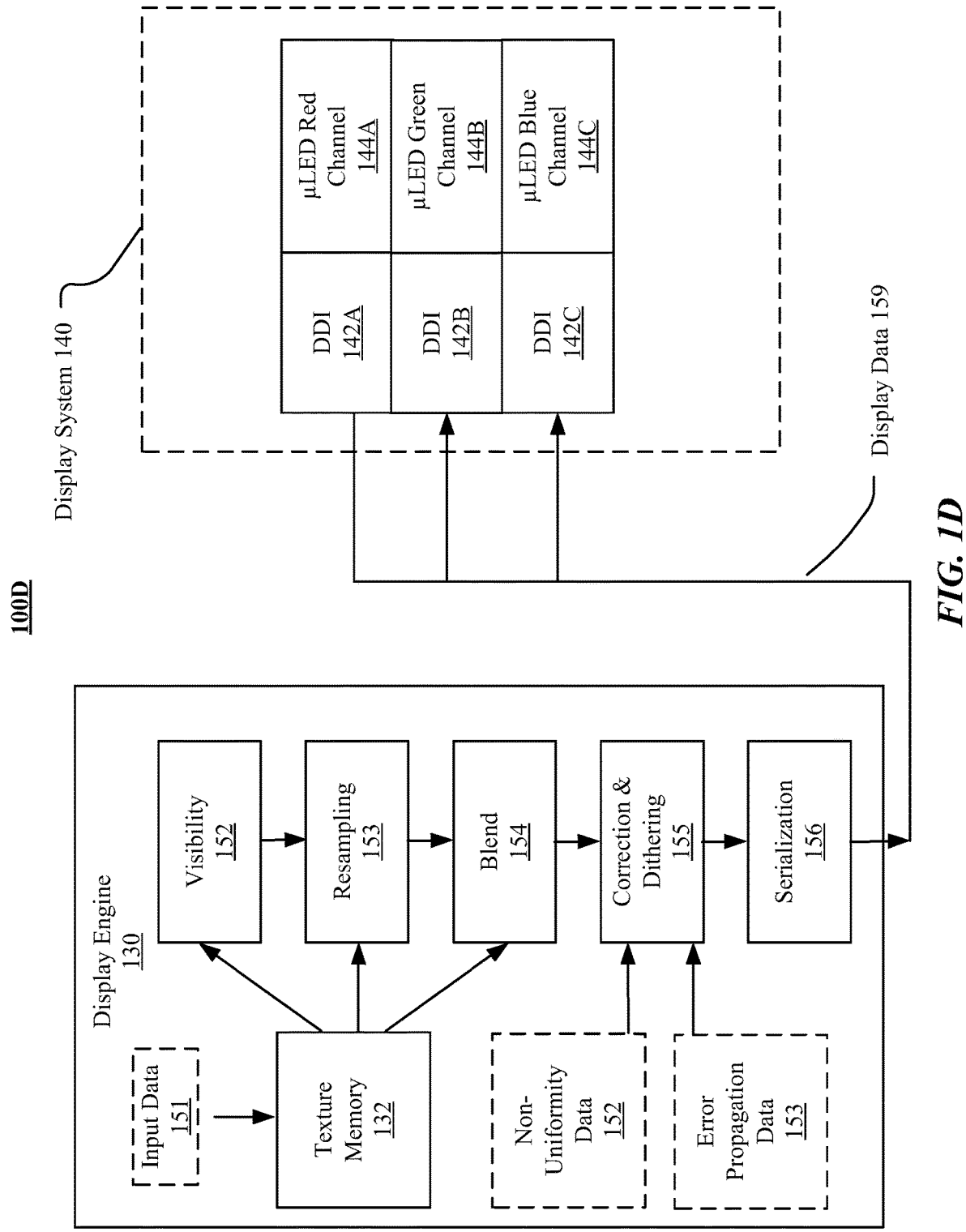
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
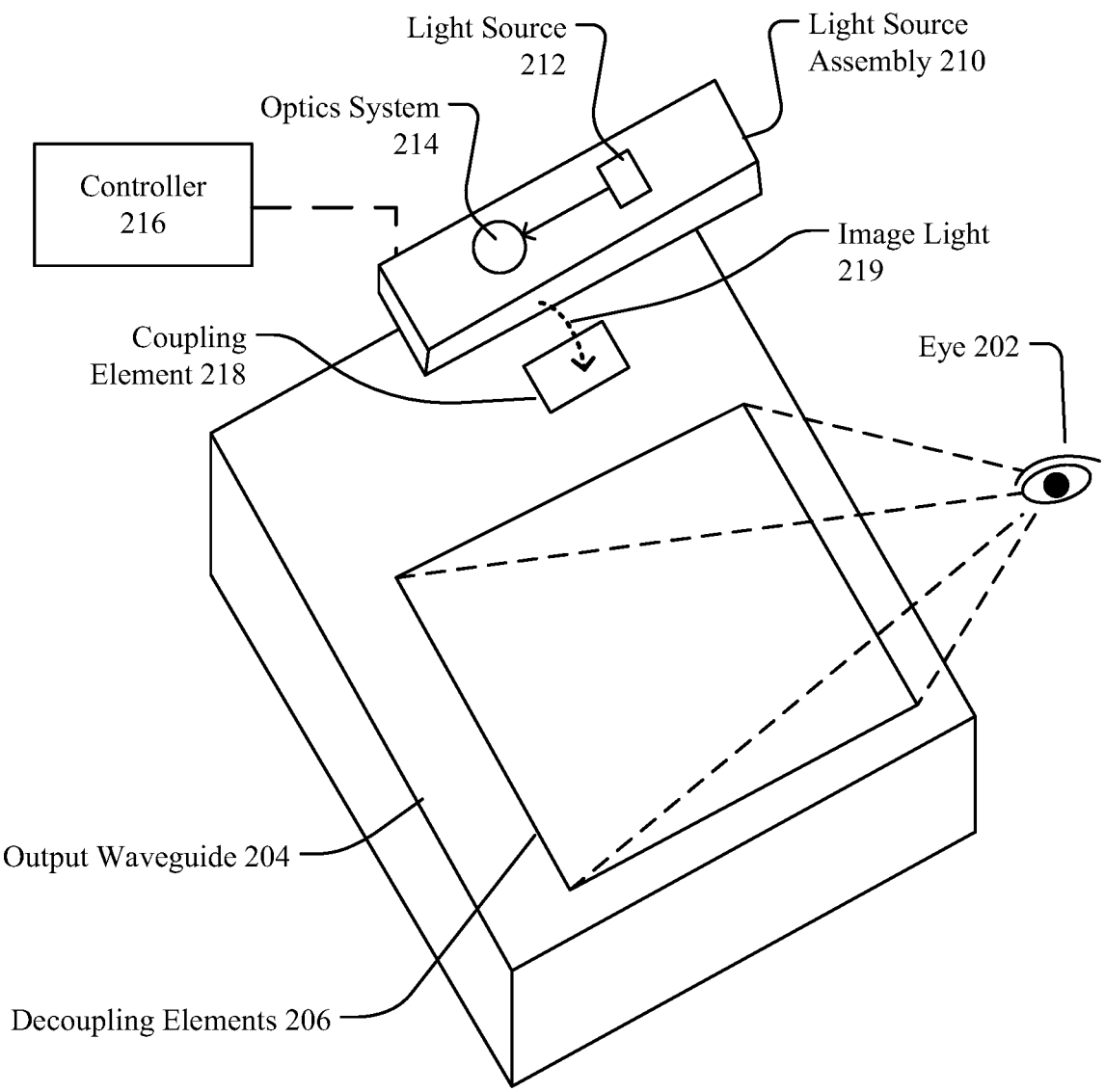
FIG. 2A illustrates an example scanning waveguide display.
Figure 3A:
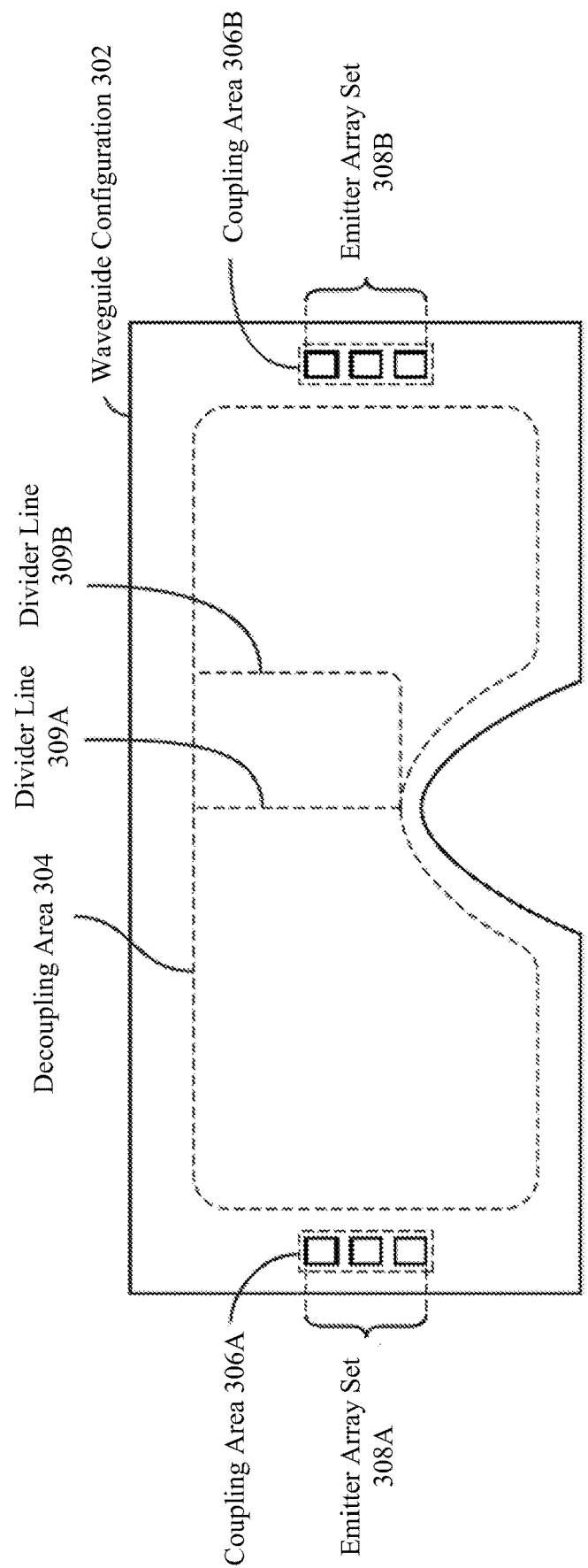
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
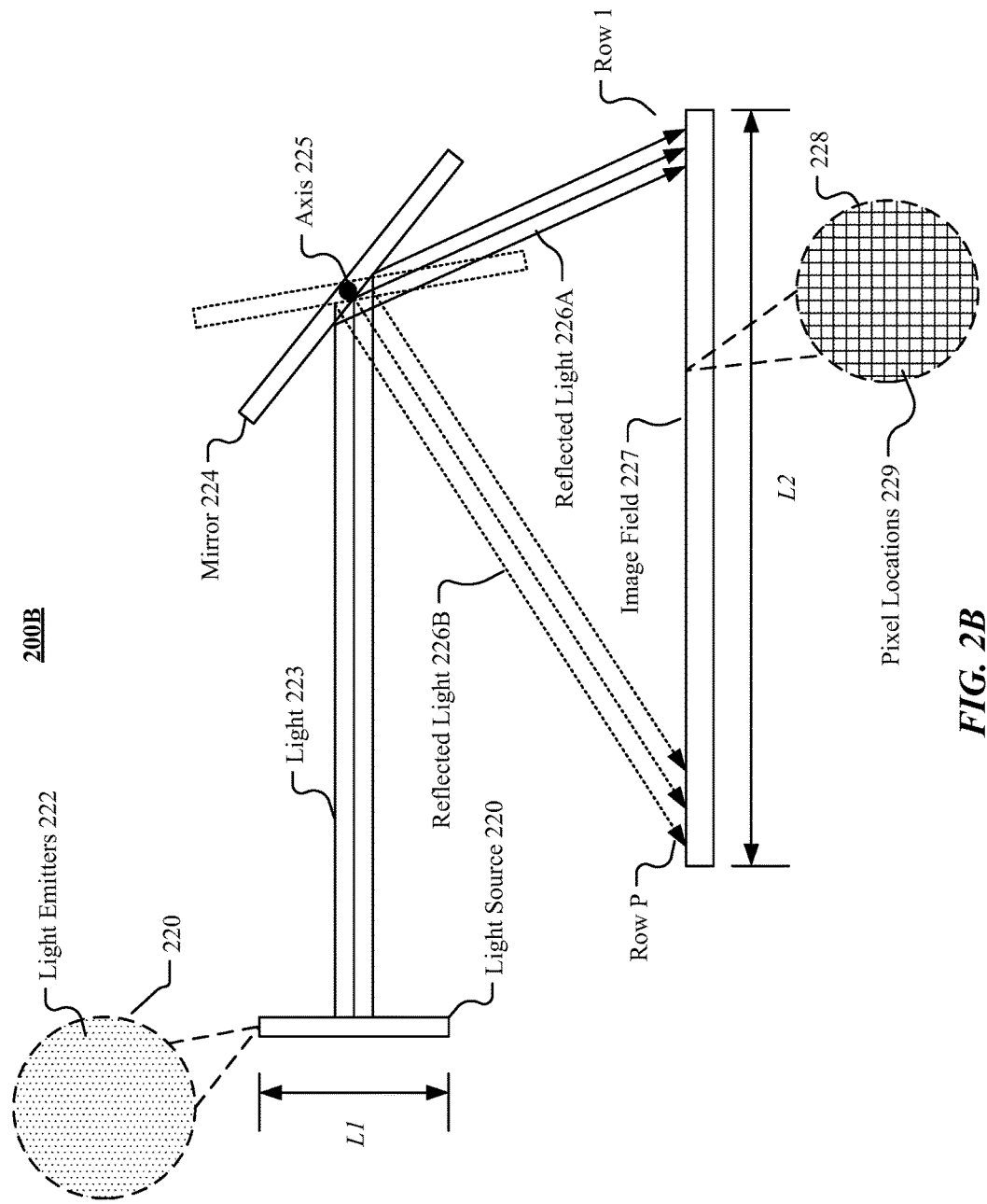
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
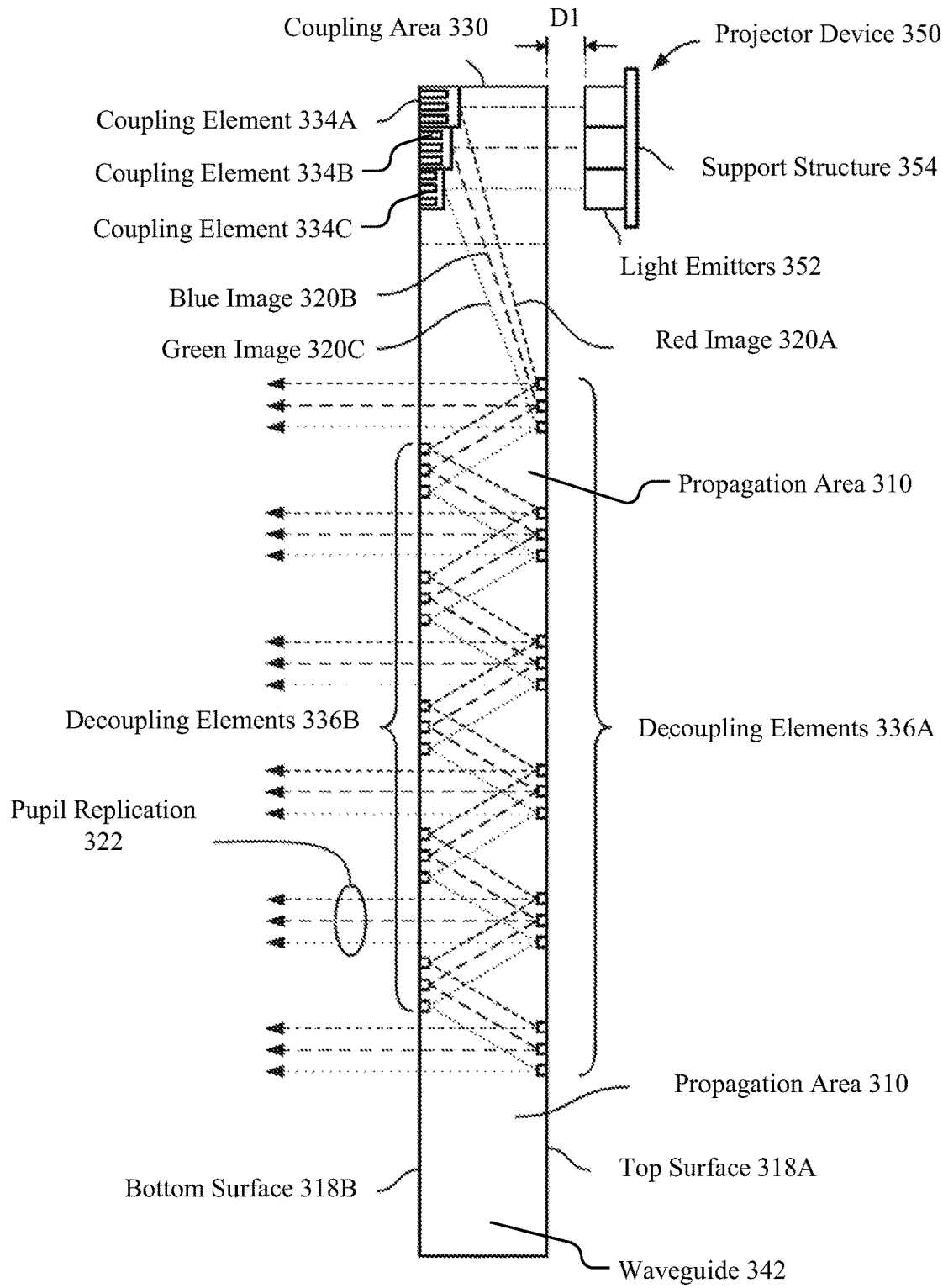
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 µm to approximately 500 µm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

Figure 4A:
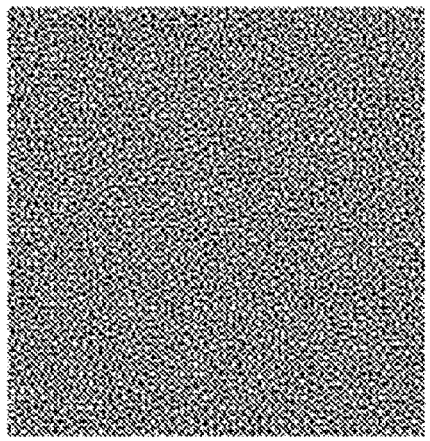
FIG. 4A illustrates an example dithering mask based on dot patterns with blue-noise properties and satisfying spatio stacking constraints.
Figure 4D:
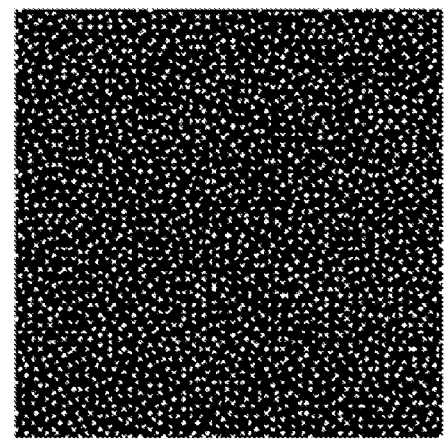
FIGS. 4B-D illustrate example dot patterns for grayscale level 1, 8, and 32 in a grayscale level range of [0, 255].
Figure 4C:
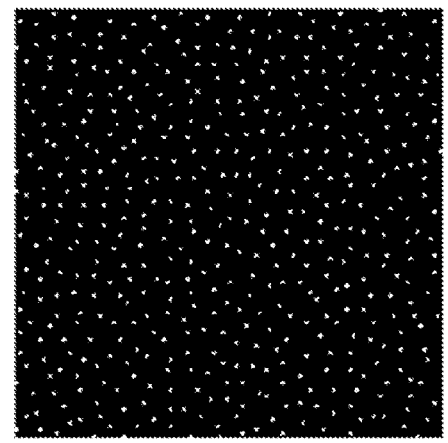
Figure 4B:
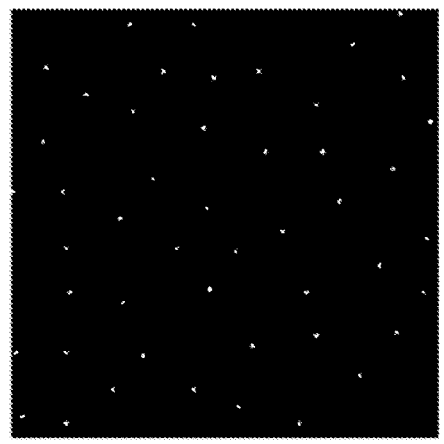

FIG. 4A illustrates an example dithering mask 400A based on dot patterns with blue-noise properties and satisfying spatio stacking constraints. FIGS. 4B-D illustrate example dot patterns (e.g., 400B, 400C, 400D) for grayscale level 1, 8, and 32 in the grayscale level range of [0, 255]. In particular embodiments, the system may generate spatio dithering masks based on dot patterns with blue-noise properties. The dithering mask may include a number of dot patterns with each dot pattern having a dot density corresponding to a grayscale level within the grayscale level range corresponding to the quantization range. A dot pattern for a higher grayscale level may have a higher dot density than a dot pattern for a lower grayscale level. The dot patterns may be chosen to have blue-noise properties (e.g., with the frequency spectrum being blue-noise weighted). The grayscale level range corresponding to the quantization range may be determined by the bit length of the display. For example, an 8-bit display may have a grayscale level range of [0, 255]. As another example, a 6-bit display may have a grayscale level range of [0, 63]. As another example, a 4-bit display may have a grayscale level range of [0-15]. In particular embodiments, the dot patterns of the dithering mask may have a spatial stacking property according to which a dot pattern of a grayscale level N may include all dot patterns of lower grayscale levels from 1 to N−1. For example, the dots in the dot pattern of grayscale level 1 (as shown in FIG. 4A) may be included in the dot pattern of grayscale level 8 (as shown in FIG. 4B) and in the dot pattern of grayscale level 32 (as shown in FIG. 4C). As another example, the dots in the dot pattern of grayscale level 8 (as shown in FIG. 4B) may be included in the dot pattern of the grayscale level 32 (as shown in FIG. 4C).

In particular embodiments, each dot in the dithering mask may correspond to a threshold value which equals to the lowest grayscale level allowing that dot to be turned on (i.e., the lowest grayscale level whose corresponding dot pattern includes that dot). From the lowest grayscale level to the highest grayscale level, once a dot is turned on (i.e., being included in a dot pattern of a grayscale level), the dot may stay in the turn-on state for all higher grayscale levels (i.e., being included in the dot patterns of all higher grayscale levels). The spatio stacking properties of the dot patterns may allow all dot patterns to be encoded into one dithering mask. In particular embodiments, the dithering mask (e.g., 400A in FIG. 4A) may include all the dot patterns (which are spatially stacked together) corresponding to all grayscale levels of the quantization range which may correspond to the gray level bits of the display (e.g., [0, 255] for 8-bit display, [0, 63] for 6-bit display, [0, 15] for 3-bit display). The dithering mask (e.g., 400A in FIG. 4A) may have a third dimension for storing the threshold values associated with the respective dots. In particular embodiments, the threshold values stored in the dithering mask may be the actual grayscale level values (e.g., [0, 255] for 8-bit display). In particular embodiments, the threshold values stored in the dithering mask may be normalized grayscale level values (e.g., [0, 1] for any bit display). In this case, the threshold values may be determined by the normalized grayscale level range of [0, 1] and the number of grayscale levels (e.g., 255 for 8-bit display). For example, for an 8-bit display, the threshold values could be 0, 1/255, 2/255 . . . 8/255 . . . 32/255 . . . 255/255, etc. As another example, for a 3-bit display, the threshold values could be 0, 1/7, 2/7, . . . 7/7, etc.

In particular embodiments, the system may determine dithered colors based on a color dithering mask (which satisfies spatial stacking constraints) and barycentric weights of target color values with respect to a barycentric coordinate system. The system may determine, for a target color value, a barycentric coordinate system corresponding to a tetrahedron (e.g., of a unit cube) based on a determination that the target color value falls within that tetrahedron space. The system may determine the barycentric weights $W=[w_1, w_2, w_3, w_4]$ of the target color value with respect to the four vertices of the barycentric coordinate system. The barycentric weights of the target color value may be determined based on comparison operations using only additions or subtractions. Mathematically, for a point falling within a tetrahedron, the point P may be represented by a linear combination of the four vertices of the tetrahedron $V=[v_1, v_2, v_3, v_4]$ as weighted by the barycentric weight of that point $W=[w_1, w_2, w_3, w_4]$ using the following equation:

$$P=WV^T \quad (1)$$

In particular embodiments, the four vertices of the barycentric coordinate system may be associated with four colors (e.g., RGBK) of a color space. A target color value within that color space may be represented by a linear combination of the colors corresponding to the tetrahedron vertices as weighted by corresponding barycentric weights.

In particular embodiments, to determine dithered colors for a target color value, the system may first determine a barycentric coordinate system corresponding to a tetrahedron that encloses the target color value. Then the system may determine the barycentric weights $W=[w_1, w_2, w_3, w_4]$ of the target color with respect to the four vertices of the barycentric coordinate system. The four vertices of the barycentric coordinate system may be associated with four colors (e.g., RGBK) of a color space. As described in earlier section of this disclosure, the target color value may be represented using a linear combination of the four colors (e.g., RGBK) associated with the four vertices of the barycentric coordinate system as weighted by the corresponding barycentric weights. In particular embodiments, the target color value may be an average color value of a target image region including a number of pixels. The system may turn different groups of pixels in the target image region into different colors (e.g., RGBK) to represent the target color using the average color value of the target image region.

In particular embodiments, the system may determine the colors for different groups of pixels of the target image region based on the barycentric weights of the target color value and a dithering mask having spatial stacking property. The system may compare a threshold value of the dithering mask to an accumulative sum of barycentric weights to determine the color for a dot in the dithering mask associated with that threshold value. For example, given a dot in the dithering mask having a threshold value Q, the system may determine a corresponding color that the dot needs to be based on a vertex of the barycentric coordinate system as selected using the following equation:

$$v = v_k \text{ for which } \sum_1^k w_i > Q \quad (2)$$

where, v is the selected vertex, $v_k$ is the vertex having an index k which is the smallest index allowing accumulative sum of the barycentric weights to be greater than the threshold value Q, $w_i$ is the barycentric weight corresponding to the i-th vertex of the barycentric coordinate system.

In particular embodiments, Equation (2) may be represented in the following equation:

$$k = \begin{cases} 1 & Q \le w_1 \\ 2 & Q \le w_1 + w_2 \\ 3 & Q \le w_1 + w_2 + w_3 \\ 4 & \text{Otherwise} \end{cases} \quad (3)$$

In particular embodiments, the system may first compare the first barycentric weight $w_1$ (which is associated with the first vertex) to the threshold value Q. If the threshold value Q is smaller than or equal to the first barycentric weight $w_1$, the system may select the color (e.g., red color) associated with the first vertex $v_1$ as the color for the dot associated with the threshold value Q. If the threshold value Q is greater than the first barycentric weight $w_1$, the system may compare the threshold value Q to the sum of the first and second barycentric weights ($w_1+w_2$). If the threshold value Q is smaller than or equal to the sum of the first and second barycentric weights ($w_1+w_2$), the system may select the color (e.g., green color) associated with second vertex $v_2$ as the color for the dot associated with the threshold value Q. If the threshold value Q is greater than $w_1+w_2$, the system may compare the threshold value Q to the sum of the first, second, and third barycentric weights ($w_1+w_2+w_3$). If the threshold value Q is smaller than or equal to $w_1+w_2+w_3$, the system may select the color (e.g., blue color) associated with the third vertex $v_3$ as the color for the dot associated with the threshold value Q. If the threshold value Q is greater than $w_1+w_2+w_3$, the system may select the color (e.g., black color) associated with the fourth vertex $v_4$ as the color for the dot associated with that threshold value Q. The system may repeat these processes to determine the colors for all dots in the dithering mask based on corresponding threshold values and target color values. As a result, the dots in the dithering mask may be assigned to four dot groups each being associated with a particular color. Each dot group associated with a particular color may include a particular percentage of dots of the total dots of the dithering mask corresponding to a barycentric weight value (e.g., 100×$w_1$% for the first group, 100×$w_2$% for the second group, 100×$w_3$% for the third group, 100×$w_4$% for the first group). The system may turn on the dots of the dithering mask with corresponding colors to represent the target color. The average color value of the target image region may substantially equal to the target color value.

FIG. 5A illustrates an example process 500A for determining dithered colors based on accumulative sum of barycentric weights and threshold values from a dithering mask. As an example and not by way of limitation, the four barycentric weights of $w_1$, $w_2$, $w_3$ and $w_4$ may corresponds to four vertices $v_1$, $v_2$, $v_3$, and $v_4$. The sum of the four barycentric weights may equal to 1. The threshold values in the dithering mask may be within a normalized range of [0, 1]. The four vertices of the barycentric coordinate system may be associated with four color (e.g., RGBK) of a color space. For a dot in the dithering mask with a threshold value $Q_x$, the system may use the processes as represented in Equations (1) and (2) to determine the corresponding color for that dot based on where the threshold value $Q_x$ falls with respect to the accumulative sum of the barycentric weights $w_1$, $w_2$, $w_3$ and $w_4$. For example, for the threshold value $Q_x$ as shown in FIG. 5A, the system may determine that the color associated with the second vertex $v_2$ as the color for the dot associated with the threshold $Q_x$ based on a determination that $Q_x$ is greater than $w_1$ and smaller than $w_1+w_2$. The system may use these processes to determine the colors for all dots in the dithering mask and turn on the dots of the dithering mask with their respective colors to represent the target color. The average color value of pixels (corresponding to the dots of the dithering mask) may substantially equal to the target color value. It is notable that the RGBK colors herein are for example purpose only and the systems, methods, and processes described in this disclosure are not limited thereto. A barycentric coordinate system may be associated with any color spaces with any combination of colors. It is notable that the mapping relations between the colors and the vertices of the barycentric coordinate system herein are for example purpose only and are not limited thereto. The mapping relations of the colors and the vertices of the barycentric coordinate system may be any suitable mapping relations and the systems, methods, and processes as described in this disclosure may still be applicable.

FIG. 5B illustrates example dots 501B that switch to a different color caused by a slight change in the target color value. In particular embodiments, the system may use the systems, methods, and processes as illustrated in FIG. 5A to determine dithered colors for a target image. These methods may provide effective color dithering results for still images. However, for video images, these methods may generate some artifacts that could negatively affect the display quality and the overall user experience. As described above, the color of a dot may depend on the associated threshold value and the barycentric weight values. In one frame, a pixel that is dithered to a first color may switch to a different color even if the target color changes slightly. For example, if a slight change in the target color causes $w_1$ to be slightly smaller and $w_2$ to be slightly greater, as shown in FIG. 5B, the dots in the area of 501B may need to switch from a second color associated with the second vertex $v_2$ to a first color associated with a first vertex $v_1$. As a result, although there is a dot density stacking property by using the threshold values in the dithering mask, this method may not provide a color stacking property. In other words, for the spatial stacking property, once a dot is turned on by a threshold value, it may remain being turned on for all thresholds larger than the initial one. However, the dot may change color from a first frame to a second frame even if the target color value changes gradually or slightly. As a result, for video images, this color dithering method may generate flickering and shimmering artifacts in video sequences. In particular embodiments, the system may use an algorithm, as will be described in detail in later sections of this disclosure, that also imposes a color stacking property, to generate images with dithered colors. The color stacking property may allow a dot, after it is set to a color by a given threshold, to remain at that color for all thresholds larger than the initial one. As a result, the generated images may satisfy a color stacking constraint and reduce the occurrence of artifacts.

Figure 6:
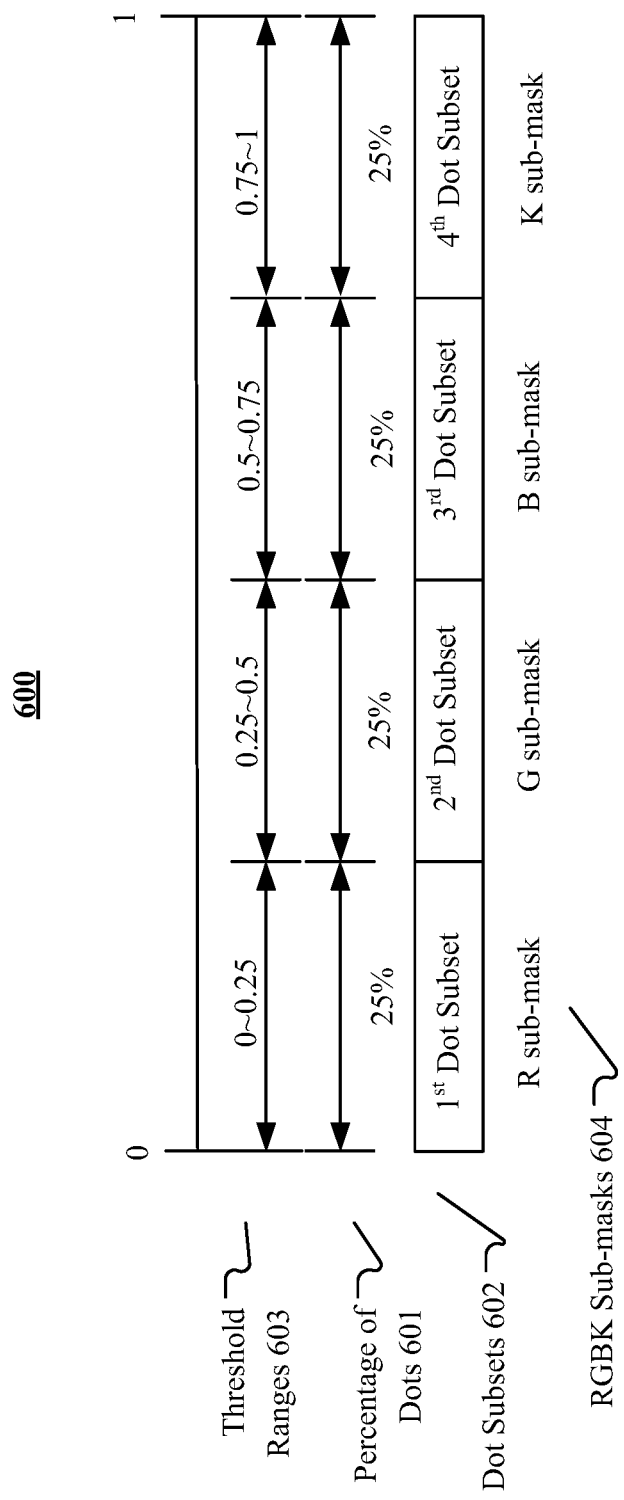
FIG. 6 illustrates an example arrangement of the dots in a color dithering mask including four sub-masks.

FIG. 6 illustrates an example arrangement 600 of the dots in a color dithering mask including four sub-masks. In particular embodiments, the system may generate a color dithering mask based on a conventional dithering mask and a color space (e.g., a RGBK color space). The system may generate the color dithering mask by dividing the dots in a conventional dithering mask into a number of dot subsets corresponding the colors of a color space. As an example and not by way of limitation, the system may divide the dots in a conventional dithering mask into four subsets corresponding to four colors of RGBK, as shown in FIG. 6. The RGBK colors may correspond to a color space associated with the four vertices of a barycentric coordinate system. Each dot subset may include a pre-determined percentage of dots 601 (e.g., 25%) of the total dots of the conventional dithering mask. Each dot subset (e.g., four dot subsets 602) may correspond to a threshold range (e.g., threshold ranges 603) corresponding to a portion (e.g., 25%) of the normalized range of [0, 1]. For example, for a dithering mask having threshold values being within a normalized range of [0, 1], the system may determine the first dot subset including dots having threshold values within a first range of [0, 0.25], a second dot subset including dots having threshold values within a second range of [0.25, 0.5], a third dot subset including dots having threshold values within a third range of [0.5, 0.75], and a fourth dot subset including dots having threshold values within a fourth range of [0.75, 1]. The maximum dot density of each subset may be 0.25 corresponding to a quarter of the normalized range of [0, 1].

In particular embodiments, the dots in each subset (e.g., dot subsets 602) may form a sub-mask being assigned with a particular identifier. For example, the four dot subsets 602 may be referred as RGBK sub-masks, respectively. It is notable that the dots in a sub-mask being assigned with a particular color identifier (e.g., RGBK sub-masks) may not necessary be turned on with that particular color of RGBK. Instead, a dot in any sub-mask may be turned on with any color of the color space. For example, a dot in the K sub-mask may be turned into any color of red, green, blue, or black. In particular embodiments, the RGBK sub-masks 604 may be used as sub-mask identifiers indicating particular orders in which the dots in each sub-mask are considered for a particular color. For example, for representing a target color with a red color component, the dots in the R sub-mask may be first selected for red color before considering the dots from other dot subsets. If the dots in the R sub-mask are not enough to represent the target red color component, the dots of other sub-masks may be used. It is notable that the RGBK tetrahedron herein is for example purpose only and the tetrahedron is not limited thereto. A barycentric coordinate system may be associated with any combination of colors, and the systems, methods, and processes described in this disclosure are still applicable. It is notable that the mapping relations between the dot subsets and the color sub-mask identifiers herein are for example purpose only and are not limited thereto. The mapping relations of the dot subsets and the color sub-mask identifiers may be any suitable mapping relations and the systems, methods, and processes as described in this disclosure are still applicable.

In particular embodiments, the system may use an average color of an image region which includes a number of groups of pixels (corresponding to dots in a color dithering mask) with different colors to represent a target color. The system may use the color dithering mask and the barycentric weights of the target color values to determine the pixel groups that need to be turned into particular colors. The pixel groups in the target image region may correspond to dot groups in the color dithering mask. To illustrate the principle and process for determining the color for the dots in the color dithering mask, a pixel in the red channel turning from full-off to full-on may be used an example. However, it is notable that the principle and process are not limited to the red pixel but are applicable to pixels of any color channels. In this disclosure, the term "pixel" may refer to a pixel in an image or a pixel corresponding to one or more light emitting elements in a display. The term "dot" may refer to a dot in the dithering mask with each dot corresponding to a pixel.

As an example and not by way of limitation, for displaying a red color changing from back to full red, the system may gradually turn on dots in different sub-masks into red in an order of RKGB. For displaying pure black, all the dots in the R sub-mask may be turned off. As the red color value increases, the dots in the R sub-mask may be gradually turned on until all the dots in the R sub-mask are turned on and the red color value reaches the level corresponding to the highest dot density in the R sub-mask r=0.25. After that, when the red color value continues to increase, the system may start to turn the dots in the K sub-mask into red until all the dots in the K sub-mask have been turned into red and the red color value reaches r=0.5. After that, when the red color value increases beyond r=0.5, the system may turn the dots in the G sub-mask to red until all the dots in the G sub-mask have been turned on and the red color value reaches r=0.75. When the red color value continues to increase beyond r=0.75, the system may turn the dots in the B sub-mask into red until all dots in the B sub-mask have been turned into red and the red color value reaches r=1. The dot densities or dot percentages (with respect to the total dots in the color dithering mask) of the dots in the RGBK sub-masks that are turned into the red color may be represented by $r_r$ (dot density of dots from the R subset that are turned into red), $r_g$ (dot density of dots from the G sub-mask that are turned into red), $r_b$ (dot density of dots from the B sub-mask that are turned into red), and $r_k$ (dot density of dots from K sub-mask that are turned into red). The red dot densities in each RGBK sub-mask may correspond to a percentage value of dots of the dithering mask that are turned into red color.

As another example and not by way of limitation, for displaying a green color changing from back to full green, the system may gradually turn on dots in different sub-masks into green in an order of GBKR. For displaying pure black, all the dots in the G sub-mask may be turned off. As the green color value increases, the dots in the G sub-mask may be gradually turned on until all the dots in that subset are turned on and the green color value reaches g=0.25. After that, when the green color value continues to increase, the system may start to turn the dots in the B sub-mask into green until all the dots in the B sub-mask have been turned into green and the green color value reaches g=0.5. After that, when the green color value increases beyond g=0.5, the system may turn the dots in the K sub-mask to green until all the dots in the K sub-mask have been turned into green and the green color value reaches g=0.75. When the green color value continues to increase beyond g=0.75, the system may turn the dots in the R sub-mask into green until all dots in the R subset have been turned into green and the green color value reaches g=1. The dot densities of the dots in the RGBK sub-masks that are turned into the green color may be represented by $g_r$ (dot density of dots from the R subset that are turned into green), $g_g$ (dot density of dots from the G subset that are turned into green), $g_b$ (dot density of dots from the B sub-mask that are turned into green), and $g_k$ (dot density of dots from K subset that are turned into green). The green dot densities in each RGBK sub-mask may correspond to a percentage value of dots of the dithering mask that are turned into green color.

As yet another example and not by way of limitation, for displaying a blue color changing from back to full blue, the system may gradually turn on dots in different sub-masks into blue in an order of BGRK. For displaying pure black, all the dots in the B sub-mask may be turned off. As the blue color value increases, the dots in the B sub-mask may be gradually turned on until all the dots in the B sub-mask are turned on and the blue color value reaches b=0.25. After that, when the blue color value continues to increase, the system may start to turn the dots in the G sub-mask into blue until all the dots in the G sub-mask have been turned into blue and the blue color value reaches b=0.5. After that, when the blue color value increases beyond b=0.5, the system may turn the dots in the R sub-mask to blue until all the dots in the R sub-mask have been turned into blue and the blue color value reaches b=0.75. When the blue color value continues to increase beyond g=0.75, the system may turn the dots in the K sub-mask into blue until all dots in the K sub-mask have been turned into blue and the blue color value reaches b=1. The dot densities of the dots in the RGBK sub-masks that are turned into the blue color may be represented by $b_r$ (dot density of dots from the R sub-mask that are turned into blue), $b_g$ (dot density of dots from the G sub-mask that are turned into blue), $b_b$ (dot density of dots from the B sub-mask that are turned into blue), and $b_k$ (dot density of dots from K subset that are turned into blue). The green dot densities in each RGBK sub-mask may correspond to a percentage value of dots of the color dithering mask that are turned into blue color.

In particular embodiments, the system may determine the barycentric weights w=[$w_1$, $w_2$, $w_3$, $w_4$] of a target color value with respect to the four vertices of an associated barycentric coordinate system (e.g., a tetrahedron associated with a RGBK color space). As a mathematical constraint of the barycentric coordinate system, the sum of the barycentric weights may equal to 1 as represented in the following equation:

$$\sum_{1}^{4} w_i = 1 \quad (4)$$

where, $w_i$ is the i-th barycentric weight. For a given a target color value that is represented in the barycentric coordinates corresponding to a tetrahedron enclosing the target color value, the four barycentric weights may each correspond to a percentage of dots in the color dithering mask that need to be turned into an associated color. For example, the first barycentric weight $w_1$ may correspond to a first percentage of dots of the color dithering mask that need to be turned into red. The second barycentric weight $w_2$ may correspond to a second percentage of dots of the color dithering mask that need to be turned into green. The third barycentric weight $w_3$ may correspond to a third percentage of dots of the color dithering mask that need to be turned into blue. The fourth barycentric weight $w_4$ may correspond to a fourth percentage of dots of the color dithering mask that need to be turned into black. With each dot in the color dithering mask being turned into a corresponding color, the dots in the color dithering mask in combination may have an average color that is substantially equal the target color value. The system may turn on the pixels in the target image regions into corresponding colors according the corresponding dots in the dithering mask. As a result, the target image region may have an average color value which is substantially equal to the target color value.

In particular embodiments, the system may determine a number of dot groups in the color dithering mask that need to be turned into particular colors. The dot groups that need to be turned into particular color may be determined based on barycentric weights of the target color values and the color dithering mask. As an example and not by way limitation, for a given target color value having the barycentric weights of W=[$w_1$, $w_2$, $w_3$, $w_4$] with respect to a tetrahedron associated with a RGBK color space, the four barycentric weights may correspond to four groups of dots in the color dithering mask that need to be turned into RGBK colors, respectively. For the RGBK color space, the first barycentric weight $w_1$ may correspond to a first group of dots in the color dithering mask that need to be turned into red. The first dot group may include 100×$w_1$% of total dots in the color dithering mask. The second barycentric weight $w_2$ may correspond to a second group of dots in the color dithering mask that need to be turned into green. The second dot group may include 100×$w_2$% of total dots in the color dithering mask. The third barycentric weight $w_3$ may correspond to a third group of dots in the color dithering mask that need to be turned into blue. The third dot group may include 100×$w_3$% of total dots in the color dithering mask. The fourth barycentric weight $w_3$ may correspond to a fourth group of dots in the color dithering mask that need to be turned into black. The fourth dot group may include 100× $w_4$% of total dots in the color dithering mask. Each dot group that needs to be turned into a particular color may include one or more subgroups of dots from one or more sub-masks. The system may determine the dot subgroups in the RGBK sub-masks based on corresponding barycentric weight values, as will be described in detail in later sections of this disclosure.

It is notable that the groups of dots that need to be turned into particular colors may not correspond to the dot subsets, as shown in FIG. 6, which each contains a fixed percentage (e.g., 25%) of dots of the color dithering mask. Each group of dots that need to be turned into a particular color may include one or more subgroups of dots from one or more dot subsets or sub-masks. For example, the group of dots that need to be turned into red color may include a first subgroup of dots from the R sub-mask, a second subgroup of dots from the K sub-mask, a third subgroup of dots from G sub-mask, or a fourth subgroup of dots from B sub-mask. The one or more dot subgroups in combination may form the dot group that needs to be turned into a particular color corresponding to a percentage value as determined by a corresponding barycentric weight value. It is notable that, for clarification of the description, the term "dot subset" in this disclosure may be used for referring to dot subsets or subgroups for generating the sub-mask (e.g., as shown in FIG. 6). The term "dot subgroup" in this disclosure may be used for referring to dot subsets or subgroups that need to be actually turned into a particular color. However, it is notable that the terms "dot subset" and "dot subgroup" may be interchangeable in meaning.

In particular embodiments, the system may determine the dot subgroups in each sub-mask (e.g., RGBK sub-masks 604 in FIG. 6) of the color dithering mask that need to be turned into particular colors. Each dot subgroup may include a particular percentage of dots in an associated sub-mask. As an example and not by way of limitation, for a given target color value having the barycentric weights of $w=[w_1, w_2, w_3, w_4]$ with respect to tetrahedron associated with a RGBK color space, the system may first determine the dot subgroups in the RGBK sub-masks that need to be turned into red. The system may compare the first barycentric weight $w_1$ to the maximum dot density level 0.25 of the R sub-mask to determine how many dots in the R subset that need to be turned into red using the following equation:

$$r_r = \min(w_1, 0.25) \quad (5)$$

where, $r_r$ corresponds to the subgroup of dots in the R subset that need to be turned into red, min is an operator to find the smaller value between $w_1$ and 0.25. If $w_1$ is smaller than 0.25, the system may determine that the R sub-mask has enough dots for the red dot group (which includes $100 \times w_1\%$ of the total dots in the color dithering mask). The system may not need to turn any dots in other KGB sub-masks into red. The sub-group of dots in R subset that need to be turned into red may be determined by the smaller value of $w_1$ and 0.25. If $w_1$ is greater than 0.25, the system may determine that the R sub-mask does not have enough dots for the red dot group (which includes $100 \times w_1\%$ of the total dots in the color dithering mask). The system may determine that some dots of one or more other sub-masks (e.g., KGB sub-masks) need to be turned into red.

After the above steps, the remaining dots that need to be turned into red may be $(w_1 - 0.25)$ times of total dots of the color dithering mask. The system may select other dots, that need to be turned into red, from other sub-masks in an order of KGB. For example, when w is greater than 0.25, the system may start to select dots from K sub-mask using the following equation:

$$r_k = \max(\min(0.25 - w_4, w_1 - 0.25), 0) \quad (6)$$

where, $r_k$ corresponds to the subgroup of dots in the K sub-mask that need to be turned into red, $0.25-w_4$ corresponds to the remaining dots in the K sub-mask that are still available, $w_1-0.25$ corresponds to how many more dots that are needed for red color. Since the K sub-mask dots are firstly considered to be turned into black, the maximum possible remaining dots that are available for other colors may be $(0.25-w_4)$ times of total dots in the color dithering mask. The system may compare how many dots that are needed for red color (e.g., $0.25-w_4$) to how many dots that are available for use in K sub-mask (e.g., $0.25-w_4$) to determine how many dots from K sub-mask would be turned into red. If the $w_1-0.25$ is smaller than $0.25-w_4$, the system may determine that the K sub-mask in addition to R sub-mask have enough dots to reach its target (e.g., $w_1$ times of the total dots for red color) and no dots from other subsets are needed for red color. The subgroup of dots in K sub-mask that need to be turned into red may be determined based the smaller value of $(0.25-w_4)$ and $(0.25-w_4)$ that is greater than 0. If the $w_1-0.25$ is greater than $0.25-w_4$, the system may determine that the K sub-mask and the R subset do not have enough dots to reach the target for red dots (e.g., $w_1$ times of the total dots) and some dots of other subsets are needed to be turned into red.

After the above step, the remaining dots that need to be turned into red may be $(w_1-0.25-r_k)$ times of the total dots of the dithering mask. The system may select dots from the G sub-mask using the following equation:

$$r_g = \max(\min(0.25-w_2, w_1-0.25-r_k), 0) \quad (7)$$

where, $r_g$ corresponds to the subgroup of dots in the G sub-mask that need to be turned into red. Since the G sub-mask dots are firstly considered to be turned into green, the maximum possible remaining dots that are available for other colors may be $(0.25-w_2)$ times of total dots in the color dithering mask. The system may compare how many dots that are still needed for red color (e.g., $w_1-0.25-r_k$) to how many dots that are available for use in G sub-mask (e.g., $0.25-w_2$) to determine how many dots from G sub-mask would be turned into red. If the $w_1-0.25$ is smaller than $0.25-w_4-r_k$, the system may determine that the R sub-mask, K sub-mask, and G sub-mask have enough dots to reach the target for red color (e.g., $w_1$ times of the total dots of the dithering mask) and no dots from other subsets are needed for red color. If the $w_1-0.25$ is greater than $0.25-w_4-r_k$, the system may determine that the RKG sub-masks do not have enough dots to reach the target for red color (e.g., $w_1$ times of the total dots) and some dots of the B sub-mask are needed to be turned into red.

After the above step, the remaining dots that need to be turned into red may be $(w_1-0.25-r_k-r_g)$ times of the total dots of the dithering mask. The system may select dots from the B sub-mask using the following equation:

$$r_b = \max(\min(0.25-w_3, w_1-0.25-r_k-r_g), 0) \quad (8)$$

where, $r_b$ corresponds to the subgroup of dots in the G sub-mask that need to be turned into red. Since the B sub-mask dots are firstly considered to be turned into blue, the maximum possible remaining dots that are available for other colors may be $(0.25-w_3)$ times of total dots in the color dithering mask. The system may compare the number of dots that are still needed for red color (e.g., $w_1-0.25-r_k-r_g$) to the number of dots that are available for use in B sub-mask (e.g., $0.25-w_3$) to determine how many dots from B sub-mask would be turned into red. By mathematical constraints, $w_1-0.25-r_k-r_g$ is smaller than or equal to $0.25-w_3$. All the remaining dots that are needed for red color may be selected from the B sub-mask.

As a result, the system may determine four dot subgroups of the RGBK sub-masks that need to be turned into red to represent the red color component of the target color. The four dot subgroups may include dots of respective percentages of the total dots of the color dithering mask corresponding to $r_r$, $r_k$, $r_g$, and $r_b$. In particular embodiments, the system may use the same processes and principles as described herein for determining the dots subgroups that need to be turned into green color or blue color. After the dot subgroups for red, green, and blue colors have been determined, all remaining dots in the color dithering mask may be turned into black.

In particular embodiments, the dot subgroups that need to be turned into green may be determined using the following equations using the same or similar principles for determining red dot subgroups:

$$g_b=\min(w_2, 0.25)$$

$$g_b=\max(\min(0.25-w_3, w_2-0.25), 0)$$

$$g_k=\max(\min(0.25-w_4, w_2-0.25-g_b), 0) \quad (9)$$

$$g_r=\max(\min(0.25-w_1, w_2-0.25-g_k-g_b), 0)$$

where, $g_g$ corresponds to the dot subgroup in the G sub-mask that need to be turned into green, $g_b$ corresponds to the dot subgroup in the B sub-mask that need to be turned into green, $g_k$ corresponds to the dot subgroup in the K sub-mask that need to be turned into green, $g_r$ corresponds to the dot subgroup in the R sub-mask that need to be turned into green. Similarly, the dot subgroups that need to be turned into blue may be determined using the following equations:

$$b_b=\min(w_3, 0.25)$$

$$b_g=\max(\min(0.25-w_2, w_3-0.25), 0)$$

$$b_r=\max(\min(0.25-w_1, w_3-0.25-b_9), 0) \quad (10)$$

$$b_k=\max(\min(0.25-w_4, w_3-0.25-b_g-b_r), 0)$$

where, $b_b$ corresponds to the dot subgroup in the B sub-mask that need to be turned into blue, $b_g$ corresponds to the dot subgroup in the G sub-mask that need to be turned into blue, $b_r$ corresponds to the dot subgroup in the R sub-mask that need to be turned into blue, $b_k$ corresponds to the dot subgroup in the K sub-mask that need to be turned into blue. It is notable that when the system select dots from other subsets, the dots may be selected from other subsets following a predetermined order. For example, for selecting dots for red color, the system may select dots from the four subsets following an order of RKGB. When selecting dots for green color, the system may select dots from the four subsets following an order of GBKR. When selecting dots for blue color, the system may select dots from the four subsets following an order of BGRK.

As a result, the system may determine four dot groups that need to be turned into four colors of RGBK based on the dot subgroups selected from the RGBK sub-masks. For example, the system may determine a first dot group for red color. The first dot group for red color may include $w_1$ times of the total dots in the color dithering mask. The first dot group for red color may include dots of one or more subgroups including: a first subgroup of dots in the R sub-mask, a second subgroup of dots in the G sub-mask, a third subgroup of dots in the B sub-mask, or a fourth subgroup of dots in the K subset. The first, second, third, and fourth subgroups of dots may include dot percentages corresponding to $r_r$, $r_k$, $r_g$, and $r_b$ times of the total dots of the color dithering mask, respectively. As another example, the system may determine a second dot group for green color. The second dot group for green color may include $w_2$ times of the total dots in the color dithering mask. The second dot group for green color may include dots of one or more subgroups including: a first subgroup of dots in the R sub-mask, a second subgroup of dots in the K sub-mask, a third subgroup of dots in the G sub-mask, or a fourth subgroup of dots in the K sub-mask. The first, second, third, and fourth subgroups of dots may include dot percentages corresponding to $g_r$, $g_k$, $g_g$, and $g_b$ times of the total dots of the color dithering mask, respectively. As another example, the system may determine a third dot group for blue color. The third dot group for blue color may include $w_3$ times of the total dots in the color dithering mask. The third dot group for green color may include dots of one or more subgroups including: a first subgroup of dots in the R sub-mask, a second subgroup of dots in the K sub-mask, a third subgroup of dots in the G sub-mask, or a fourth subgroup of dots in the K sub-mask. The first, second, third, and fourth subgroups of dots may include dot percentages corresponding to $b_r$, $b_k$, $b_g$, and $b_b$ times of the total dots of the color dithering mask, respectively. The system may determine a fourth dot group for back color. The fourth dot group may include all remaining dots in the color dithering mask that are not included in the first, second, and third dot groups. In particular embodiments, the barycentric weights of the target color value and the corresponding dot percentages of associated subgroups may satisfy constrains as described in the following equations:

$$w_1=r_r+r_k+r_g+r_b$$

$$w_2=g_r+g_k+g_g+g_b \quad (11)$$

$$w_3=b_r+b_k+b_g+b_b$$

where, $r_r+g_r+b_r+k_r=0.25$, $r_k+g_k+b_k+k_k=0.25$, $r_g+g_g+b_g+k_g=0.25$, and $r_b+g_b+b_b+k_b=0.25$.

Figure 7A:
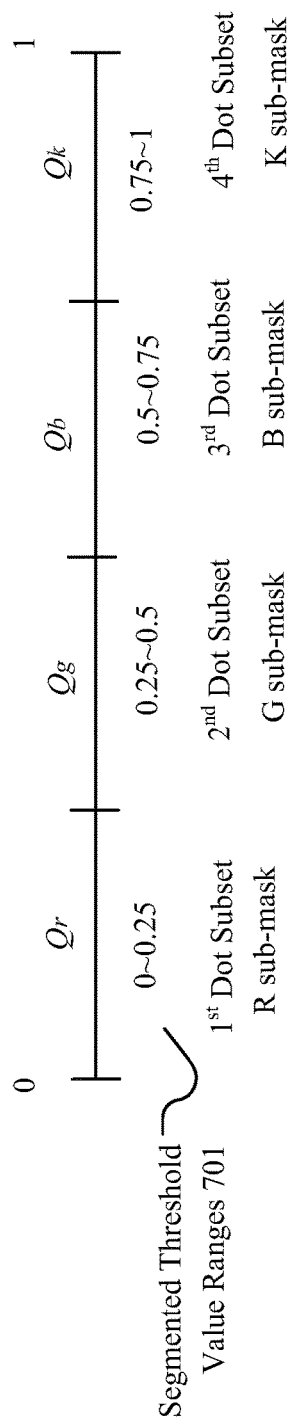
FIG. 7A illustrates an example process for determining sub-mask threshold values.

FIG. 7A illustrates an example process 700A for determining sub-mask threshold values. In particular embodiments, a dot in the color dithering mask may have a threshold value Q in a normalized range of [0, 1] and the sub-mask threshold values $Q_r$, $Q_g$, $Q_b$, and $Q_k$ may correspond to segmented threshold value ranges 701 of [0, 0.25], [0.25, 0.5], [0.5, 0.75], and [0.75, 1] each having a maximum dot density of 0.25. In particular embodiments, for a given dot of the color dithering mask having a threshold value of Q, the system may determine the sub-mask threshold values for the RGBK sub-masks based on where the threshold value Q falls within the normalized range of [0, 1]. When the threshold value Q falls within one of the segmented threshold value ranges 701, the associated dot may belong to a corresponding sub-mask. The corresponding sub-mask threshold values may be determined using the following equations:

$$Q_r=Q \text{ if } Q \in [0, 0.25]$$

$$Q_g=\text{mod}(Q, 0.25) \text{ if } Q \in (0.25, 0.5]$$

$$Q_b=\text{mod}(Q, 0.50) \text{ if } Q \in (0.5, 0.75] \quad (12)$$

$$Q_k=\text{mod}(Q, 0.75) \text{ if } Q \in (0.75, 1]$$

where, Q is a threshold for a dot of the color dithering mask, $Q_r$ is the sub-mask threshold value for R sub-mask, $Q_g$ is the sub-mask threshold value for G sub-mask, $Q_b$ is the sub-mask threshold for the B sub-mask, $Q_k$ is the sub-mask threshold value for the K sub-mask, mod is a remainder operator. It is notable that each equation of Equations (12) may be applicable only when Q falls within the corresponding value ranges. When the Q falls beyond the corresponding ranges, the sub-mask threshold values $Q_r$, $Q_g$, $Q_b$, and $Q_k$ may equal to the maximum dot decently 0.25 of the sub-masks when Q falls in a higher threshold ranges and equal to 0 when Q falls in a lower threshold range. As an example and not by way of limitation, for a dot in the color dithering mask having a threshold value of 0.6, the corresponding $Q_r$, $Q_g$, $Q_b$, and $Q_k$ may equal to 0.25, 0.25, 0.1, 0, as determined by Equations (12). As another example, for a dot in the color dithering mask having a threshold value of 0.4, the $Q_r$, $Q_g$, $Q_b$, and $Q_k$ may equal to 0.25, 0.15, 0, 0, respectively. It is notable that the process for creating four dithering masks from one dithering mask Q as described here is for example purpose only and the process for creating dithering masks is not limited thereto. There are a number of ways of for creating dithering masks that would be applicable for the systems, methods, and processes as described in this disclosure.

Figure 7B:
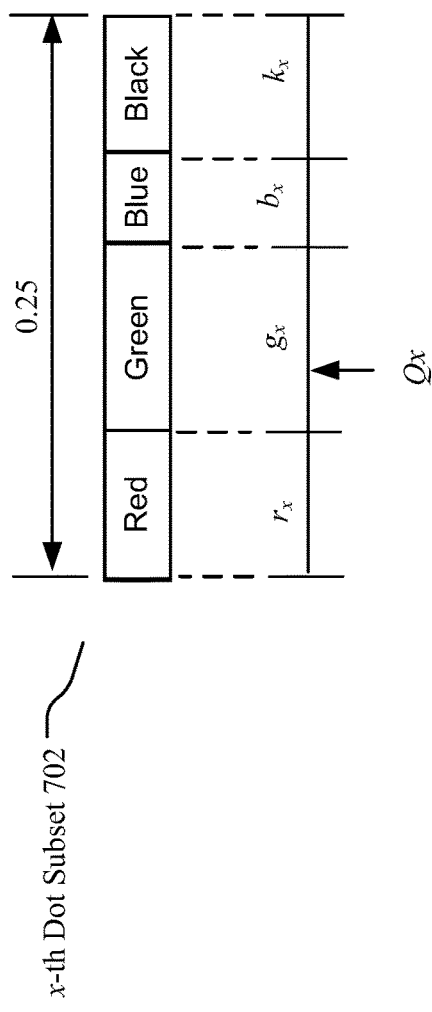
FIG. 7B illustrates an example process for determining a color for a dot in a sub-mask.

FIG. 7B illustrates an example process 700B for determining a color for a dot in a sub-mask. In particular embodiments, for each dot in the color dithering mask, the system may determine a color that the dot needs to be turned into for representing a corresponding target color. The system may determine the colors for the dots in the color dithering mask by comparing the sub-mask threshold values to accumulative sums of percentage numbers of dots in each sub-mask that need to be turned into each color using the following equation:

$$k = \begin{cases} 1 & (Q_r < r_r) \lor (Q_g < r_g) \lor (Q_b < r_b) \lor (Q_k < r_k) \\ 2 & (Q_r < r_r + g_r) \lor (Q_g < r_g + g_g) \lor (Q_b < r_b + g_b) \lor \\ & (Q_k < r_k + g_k) \\ 3 & (Q_r < r_r + g_r + b_r) \lor (Q_g < r_g + g_g + b_g) \lor \\ & (Q_b < r_b + g_b + b_b) \lor (Q_k < r_k + g_k + b_k) \\ 4 & \text{Otherwise} \end{cases} \quad (13)$$

where, k is the index of vertex whose corresponding color is selected as the color for that dot, $Q_r$, $Q_g$, $Q_b$, and $Q_k$ are sub-mask threshold values, $r_r$, $r_g$, $r_b$, and $r_k$ are percentage numbers of dots (with respect to the total dots in the color dithering mask) in RGBK sub-masks that need to be turned into red color, $g_r$, $g_g$, $g_b$, and $g_k$ are percentage numbers of dots (with respect to the total dots in the color dithering mask) in RGBK sub-masks that need to be turned into green color, $b_r$, $b_g$, $b_b$, and $B_k$ are percentage numbers of dots (with respect to the total dots in the color dithering mask) in RGBK sub-masks that need to be turned into blue color. It is notable that the percentage numbers of dots may be with respect to the total dots in the color dithering mask rather than the dot subsets corresponding the sub-mask.

As an example and not by way of limitation, for an x-th dot subset 702 corresponding to a particular sub-mask, the dots in that sub-mask may include one or more sub-groups each including dots of corresponding percentage numbers (e.g., $r_x$, $g_x$, $b_x$, and $r_x$) for a particular color (e.g., RGBK colors). For a dot in the color dithering mask having a threshold value Q, the system may first determine the sub-mask threshold value $Q_x$ (e.g., $Q_r$, $Q_g$, $Q_b$, or $Q_k$) of that sub-mask based on the threshold value Q using Equations (12). Then, the system may compare the sub-mask threshold $Q_x$ to an accumulative sum of the percentage numbers (e.g., $r_x$, $g_x$, $b_x$, and $r_x$) to determine the color that the dot should be turned into. For example, when $Q_x$ is smaller than $r_x$, the system may select the red color associated with the first vertex (k=1) of the barycentric coordinate system as the selected color for that dot. As another example, when $Q_x$ is greater than $r_x$ and smaller than $(r_x+g_x)$, the system may select the green color associated with the second vertex (k=2) of the barycentric coordinate system as the selected color for that dot. As another example, when $Q_x$ is greater than $(r_x+g_x)$ and smaller than $(r_x+g_x+b_x)$, the system may select the blue color associated with the third vertex (k=3) of the barycentric coordinate system as the selected color for that dot. As another example, when $Q_x$ is greater than $(r_x+g_x+b_x)$, the system may select the black color associated with the fourth vertex (k=4) of the barycentric coordinate system as the selected color for that dot. The system may use these methods and principles as described in this disclosure to determine a color for each dot in each sub-mask of the color dithering mask. The system may generate an image by turning on the dots with corresponding colors. As a result, the generated image may have an average color in the target image region that substantially equals to a corresponding target color value. It is notable that the RGBK color space associated with a tetrahedron is used as an example only and the systems, methods, and processes are not limited thereto. Since tetrahedrons are invariant under affine transformations, the systems, methods, and processes are applicable to any suitable tetrahedrons associated with any suitable color spaces.

Figure 7C:
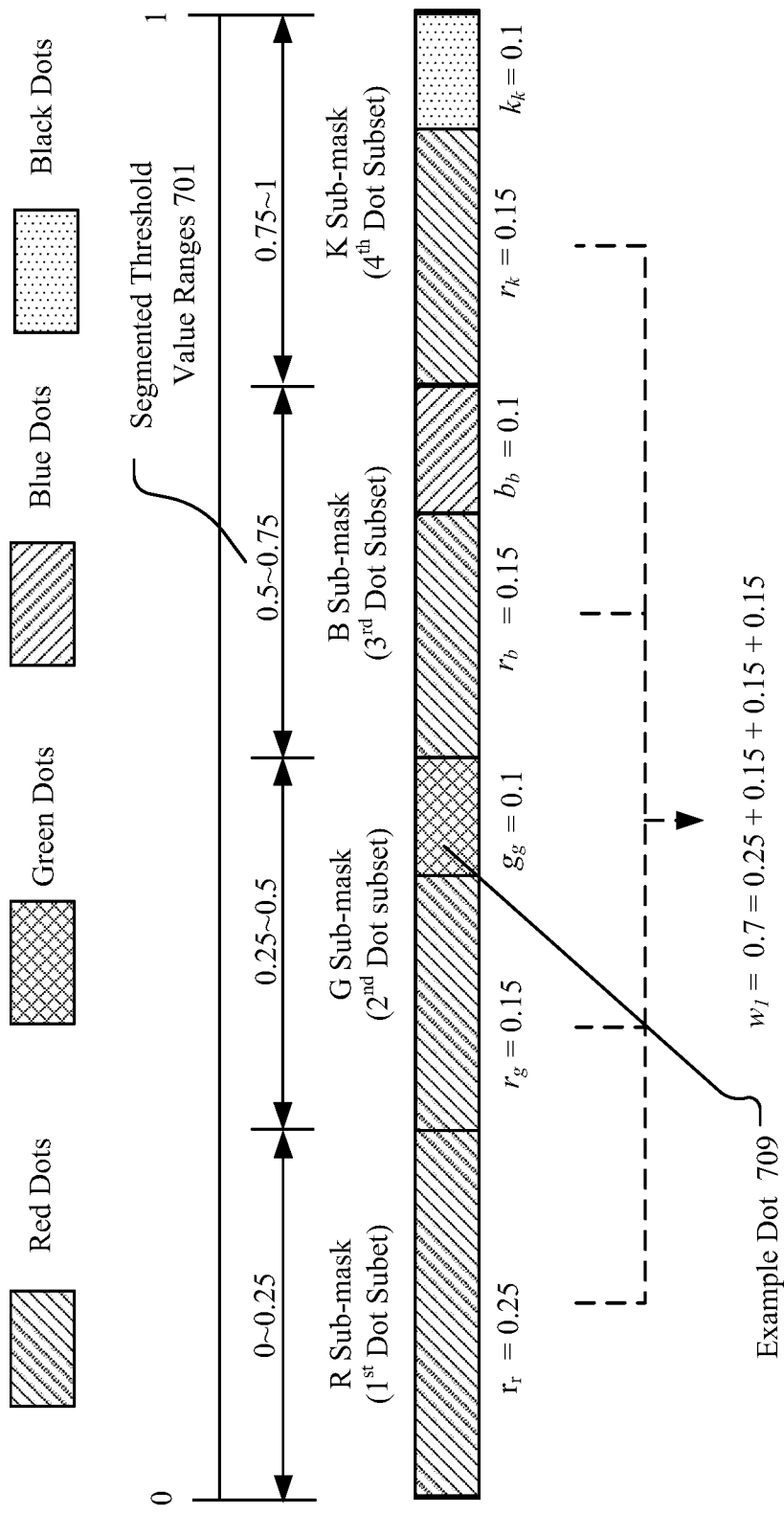
FIG. 7C illustrates a numeric example for a color dithering process.

FIG. 7C illustrates a numeric example 700C for a color dithering process. As an example and not by way of limitation, for a target color value falling within the KRGB tetrahedron, the system may determine the barycentric weights as W=[0.7, 0.1, 0.1, 0.1]. Thus, the target color may be represented by an average color of a target image region including 70% of red dots, 10% of green dots, 10% of blue dots, and 10% of black dots. The system may use Equations (5)-(10) to determine the percentage number of dots for each sub-group of each sub-mask (e.g., $r_r$=0.25, $r_g$=0.15, $g_g$=0.1, $r_b$=0.15, $b_b$=0.1, $r_k$=0.15, $k_k$=0.1, others=0). As a result, the R sub-mask may include one subgroup for red color corresponding to $r_r$=0.25 and all dots in the R sub-mask may be turned into red color. The G sub-mask may include two sub-groups for red color and green color, respectively. The dots in the first subgroup (corresponding to $r_g$=0.15) may be turned into red color and the dots in the second subgroup (corresponding to $g_g$=0.1) may be turned into green color. The B sub-mask may include two sub-groups for red color and blue color, respectively. The dots in the first subgroup (corresponding to $r_b$=0.15) may be turned into red color and the dots in the second subgroup (corresponding to $b_b$=0.1) may be turned into blue color. The K sub-mask may include two sub-groups for red color and black color, respectively. The dots in the first subgroup (corresponding to $r_k$=0.15) may be turned into red color and the dots in the second subgroup (corresponding to $k_k$=0.1) may be turned into black color. The fourth subgroups corresponding to $r_r$=0.25, $r_b$=0.15, and $r_k$=0.15 may form the red dot group in combination by $w_1$=0.7=0.25+0.15+0.15+0.15. For any given dot in the color dithering mask (including the four sub-masks of RGBK) having a threshold value Q within the normalized range of [0, 1], the system may determine which subgroup that dot falls within by determining where the threshold value Q falls. The system may use Equations (12) to determine the corresponding sub-mask threshold values. Then, the system may compare the sub-mask threshold values to corresponding accumulative sums of percentage of numbers to determine which color that dot should be turned into. For example, for an example dot 709 whose threshold value falls within the green sub-group in the G sub-mask, the system may determine that the dot 709 should be turned into green color.

Figure 8:
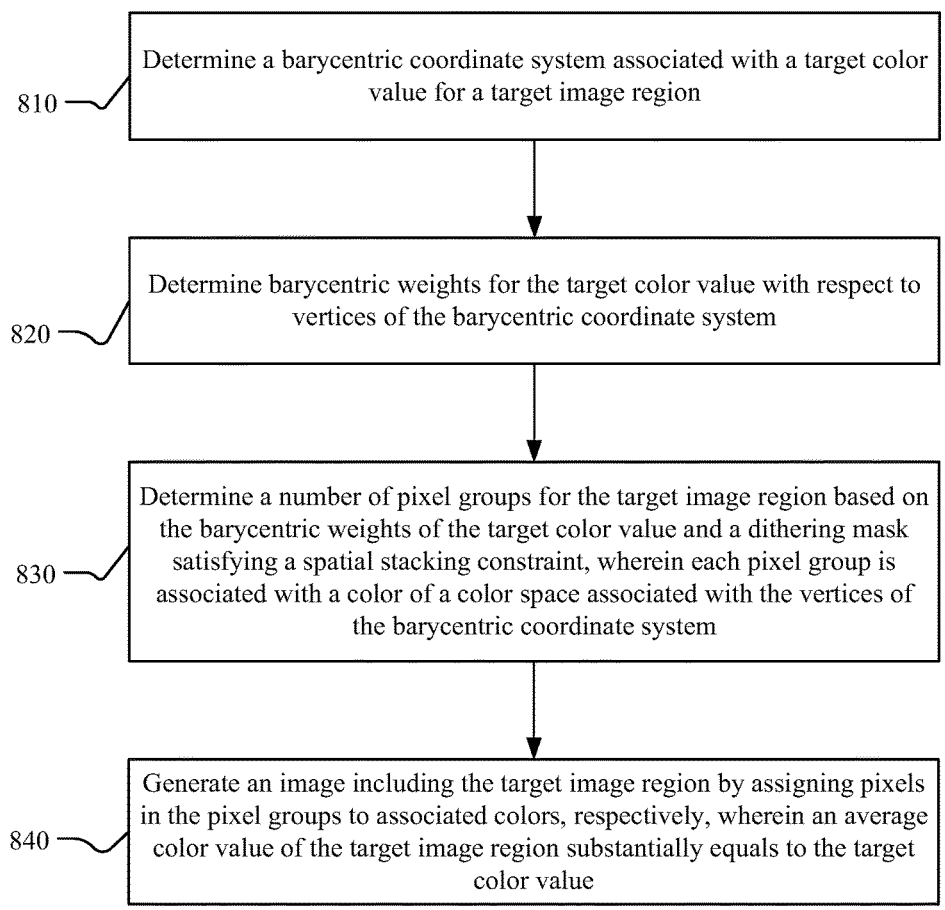
FIG. 8 illustrates an example method for dithering colors based on a color dithering mask and barycentric weights of target color values.

FIG. 8 illustrates an example method 800 for dithering colors based on a color dithering mask and barycentric weights of target color values. In particular embodiments, the method may begin at step 810, where a computing system may determine a barycentric coordinate system associated with a target color value for a target image region. At step 820, the system may determine barycentric weights for the target color value with respect to vertices of the barycentric coordinate system. At step 830, the system may determine a number of pixel groups for the target image region based on the barycentric weights of the target color value and a dithering mask satisfying a spatial stacking constraint. Each pixel group may be associated with a color of a color space associated with the vertices of the barycentric coordinate system. At step 840, the system may generate an image including the target image region by assigning pixels of different pixel groups to associated colors, respectively. An average color value of the target image region may substantially equal to the target color value.

In particular embodiments, the generated image may satisfy a color stacking property which allows a pixel, after being set to a particular color, to stay with that particular color when the target color value increases gradually. In particular embodiments, the dithering mask may include a number of sub-masks each including a pre-determined percentage of dots of the dithering mask. The pixel groups of different colors may be determined based on corresponding dot groups of the dithering mask and the dot groups of the dithering mask may be determined based on the sub-masks. In particular embodiments, the system may determine, one or more dot sub-groups for each sub-mask based on the barycentric weights of the target color value and threshold ranges of the plurality of sub-masks with each dot sub-group being associated with a particular color of the color space. In particular embodiments, each of the dot groups may include one or more of the dot sub-groups from one or more sub-masks of the dithering mask.

In particular embodiments, the system may determine, a percentage value for each dot sub-group. The percentage value may correspond to a percentage of dots in that dot-subgroup with respect to a total dot number of the dithering mask. In particular embodiments, the system may access, from the dithering mask, a threshold value associated with a dot in the dithering mask. The system may determine a number of sub-mask threshold values each being associated with a sub-mask of the sub-masks. The sub-mask threshold values may be determined based on the barycentric weights of the target color value and the threshold ranges of the sub-masks. In particular embodiments, the system may compare a sub-mask threshold value to an accumulative sum of one or more percentage values of one or more dot sub-groups of a particular sub-mask. The system may select a vertex of the barycentric coordinate system based on a comparison result and assign the dot associated with the threshold value to a corresponding color associated with the selected vertex.

In particular embodiments, the barycentric coordinate system may be determined based on a tetrahedron enclosing the target color value. In particular embodiments, the color space may be associated with vertices of the tetrahedron and the target color value may correspond to a linear combination of a number of colors of the color space as weighted by the barycentric weights. In particular embodiments, the dithering mask may include a number of stacked dot patterns each including a number of dots. Each dot of the dithering mask may be associated with a threshold value corresponding to a lowest threshold value which has a corresponding dot pattern including that dot.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for dithering colors based on a color dithering mask and barycentric weights of target color values including the particular steps of the method of FIG. 8, this disclosure contemplates any suitable method for dithering colors based on a color dithering mask and barycentric weights of target color values including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
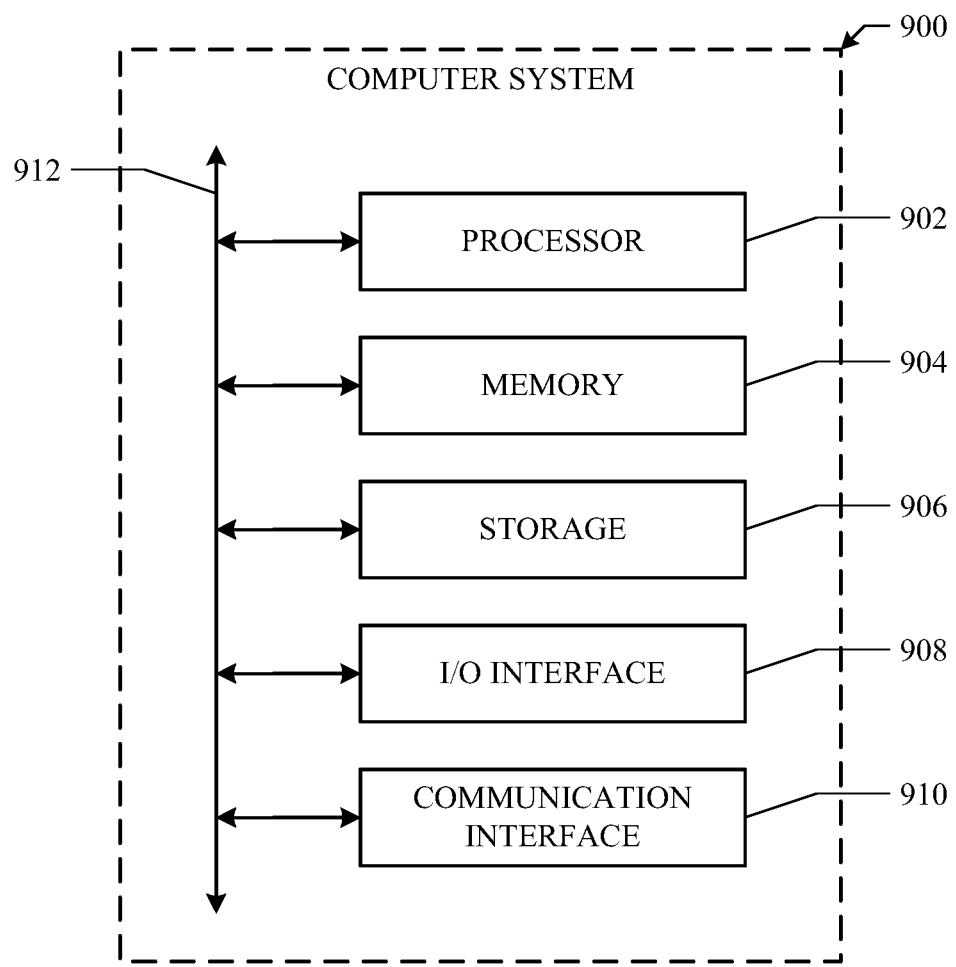
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a barycentric coordinate system associated with a target color value for a target image region;
   determining barycentric weights for the target color value with respect to vertices of the barycentric coordinate system;
   determining a plurality of pixel groups for the target image region based on the barycentric weights of the target color value and a dithering mask satisfying a spatial stacking constraint, wherein each pixel group is associated with a color of a color space associated with the vertices of the barycentric coordinate system; and
   generating an image comprising the target image region by assigning pixels in the plurality of pixel groups to associated colors, respectively, wherein an average color value of the target image region substantially equals to the target color value.

2. The method of claim 1, wherein the generated image satisfies a color stacking property which allows a pixel, after being set to a particular color, to stay with that particular color when the target color value increases gradually.

3. The method of claim 1, wherein the dithering mask comprises a plurality of sub-masks each comprising a pre-determined percentage of dots of the dithering mask, and wherein the plurality of pixel groups are determined based on a plurality of dot groups of the dithering mask, and wherein the plurality of dot groups of the dithering mask are determined based on the plurality of sub-masks.

4. The method of claim 3, further comprising:
   determining, one or more dot sub-groups for each sub-mask based on the barycentric weights of the target color value and threshold ranges of the plurality of sub-masks, wherein each dot sub-group is associated with a particular color of the color space.

5. The method of claim 4, wherein each of the plurality of dot groups comprises one or more of the dot sub-groups from one or more sub-masks of the plurality of sub-masks.

6. The method of claim 4, further comprising:
   determining, a percentage value for each dot sub-group, wherein the percentage value corresponds to a percentage of dots in that dot-subgroup with respect to a total dot number of the dithering mask.

7. The method of claim 6, further comprising:
   accessing, from the dithering mask, a threshold value associated with a dot in the dithering mask; and
   determining a plurality of sub-mask threshold values each being associated with a sub-mask of the plurality of sub-masks, wherein the plurality of sub-mask threshold values are determined based on the barycentric weights of the target color value and the threshold ranges of the plurality of sub-masks.

8. The method of claim 7, further comprising:
comparing a sub-mask threshold value to an accumulative sum of one or more percentage values of one or more dot sub-groups of a particular sub-mask;
selecting a vertex of the barycentric coordinate system based on a comparison result; and
assigning the dot associated with the threshold value to a corresponding color associated with the selected vertex.

9. The method of claim 1, wherein the barycentric coordinate system is determined based on a tetrahedron enclosing the target color value.

10. The method of claim 9, wherein the color space is associated with vertices of the tetrahedron, and wherein the target color value corresponds to a linear combination of a plurality of colors of the color space as weighted by the barycentric weights.

11. The method of claim 1, wherein the dithering mask comprises a plurality of stacked dot patterns each comprising a plurality of dots, wherein each dot of the dithering mask is associated with a threshold value, and wherein the threshold value corresponds to a lowest threshold value which has a corresponding dot pattern comprising that dot.

12. The method of claim 11, wherein each of the plurality of stacked dot patterns satisfies a spatio stacking constraint by comprising all dot patterns corresponding to lower grayscale levels.

13. One or more computer-readable non-transitory storage media embodying software that is operable when executed to:
determine a barycentric coordinate system associated with a target color value for a target image region;
determine barycentric weights for the target color value with respect to vertices of the barycentric coordinate system;
determine a plurality of pixel groups for the target image region based on the barycentric weights of the target color value and a dithering mask satisfying a spatial stacking constraint, wherein each pixel group is associated with a color of a color space associated with the vertices of the barycentric coordinate system; and
generate an image comprising the target image region by assigning pixels in the plurality of pixel groups to associated colors, respectively, wherein an average color value of the target image region substantially equals to the target color value.

14. The media of claim 13, wherein the generated image satisfies a color stacking property which allows a pixel, after being set to a particular color, to stay with that particular color when the target color value increases gradually.

15. The media of claim 13, wherein the dithering mask comprises a plurality of sub-masks each comprising a predetermined percentage of dots of the dithering mask, and wherein the plurality of pixel groups are determined based on a plurality of dot groups of the dithering mask, and wherein the plurality of dot groups of the dithering mask are determined based on the plurality of sub-masks.

16. The media of claim 15, further embodying software that is operable when executed to:
determine, one or more dot sub-groups for each sub-mask based on the barycentric weights of the target color value and threshold ranges of the plurality of sub-masks, wherein each dot sub-group is associated with a particular color of the color space.

17. A system comprising:
one or more non-transitory computer-readable storage media embodying instructions; and
one or more processors coupled to the storage media and operable to execute the instructions to:
determine a barycentric coordinate system associated with a target color value for a target image region;
determine barycentric weights for the target color value with respect to vertices of the barycentric coordinate system;
determine a plurality of pixel groups for the target image region based on the barycentric weights of the target color value and a dithering mask satisfying a spatial stacking constraint, wherein each pixel group is associated with a color of a color space associated with the vertices of the barycentric coordinate system; and
generate an image comprising the target image region by assigning pixels in the plurality of pixel groups to associated colors, respectively, wherein an average color value of the target image region substantially equals to the target color value.

18. The system of claim 17, wherein the generated image satisfies a color stacking property which allows a pixel, after being set to a particular color, to stay with that particular color when the target color value increases gradually.

19. The system of claim 17, wherein the dithering mask comprises a plurality of sub-masks each comprising a predetermined percentage of dots of the dithering mask, and wherein the plurality of pixel groups are determined based on a plurality of dot groups of the dithering mask, and wherein the plurality of dot groups of the dithering mask are determined based on the plurality of sub-masks.

20. The system of claim 19, further being configured to:
determine, one or more dot sub-groups for each sub-mask based on the barycentric weights of the target color value and threshold ranges of the plurality of sub-masks, wherein each dot sub-group is associated with a particular color of the color space.

* * * * *